(12) United States Patent
Podgorski et al.

(10) Patent No.: US 9,194,291 B2
(45) Date of Patent: Nov. 24, 2015

(54) TURBOMACHINE WINDMILL BYPASS VALVE

(75) Inventors: David J. Podgorski, Suffield, CT (US); Scott J. Beloncik, Westfield, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 471 days.

(21) Appl. No.: 13/593,678

(22) Filed: Aug. 24, 2012

(65) Prior Publication Data

US 2014/0053927 A1 Feb. 27, 2014

(51) Int. Cl.
*F16K 3/26* (2006.01)
*F02C 6/08* (2006.01)
*F02C 7/232* (2006.01)

(52) U.S. Cl.
CPC . *F02C 6/08* (2013.01); *F02C 7/232* (2013.01); *Y10T 137/87169* (2015.04)

(58) Field of Classification Search
CPC ............ F02C 6/08; F02C 7/232; F02C 9/263; Y10T 137/87169; Y10T 137/86734; Y10T 137/86799; F16K 3/26; F16K 3/265; F16K 3/32; F16K 3/34; F16K 3/24
USPC ................. 251/205; 137/596; 60/734, 38.281
See application file for complete search history.

(56) References Cited

U.S. PATENT DOCUMENTS

| 1,850,850 | A | * | 3/1932 | Peterson ........................ 251/205 |
| 2,784,728 | A | * | 3/1957 | Bathurst et al. .................. 137/47 |
| 2,826,216 | A | * | 3/1958 | Thomas ......................... 137/503 |
| 2,852,913 | A | | 9/1958 | Jorgensen et al. |
| 3,252,283 | A | | 5/1966 | Jackson et al. |
| 4,354,345 | A | | 10/1982 | Dreisbach, Jr. et al. |
| 5,110,269 | A | | 5/1992 | Fallon |
| 5,111,973 | A | * | 5/1992 | Mueller ........................ 222/386 |
| 5,339,636 | A | | 8/1994 | Donnelly et al. |
| 5,791,318 | A | * | 8/1998 | Schulz et al. .................. 123/520 |
| 5,899,058 | A | | 5/1999 | Narcus et al. |
| 6,145,318 | A | | 11/2000 | Kaplan et al. |
| 6,357,219 | B1 | | 3/2002 | Dudd, Jr. et al. |
| 6,607,175 | B1 | * | 8/2003 | Nguyen et al. ................ 251/63.5 |
| 7,997,062 | B2 | | 8/2011 | Sun et al. |
| 2009/0224190 | A1 | * | 9/2009 | Dale et al. ................. 251/129.06 |

* cited by examiner

*Primary Examiner* — Marina Tietjen
(74) *Attorney, Agent, or Firm* — Carlson, Gaskey & Olds, P.C.

(57) ABSTRACT

An example bypass valve includes a sleeve providing a bore that extends along an axis. The sleeve has at least one window. The bypass valve also includes a spool received within the bore. The spool is configured to move within the bore between a first position that restricts flow through at least one window and a second position that permits flow through the at least one window of the sleeve. An outer diameter of the spool is from 99.90 to 99.95 percent of a diameter of the bore.

17 Claims, 5 Drawing Sheets

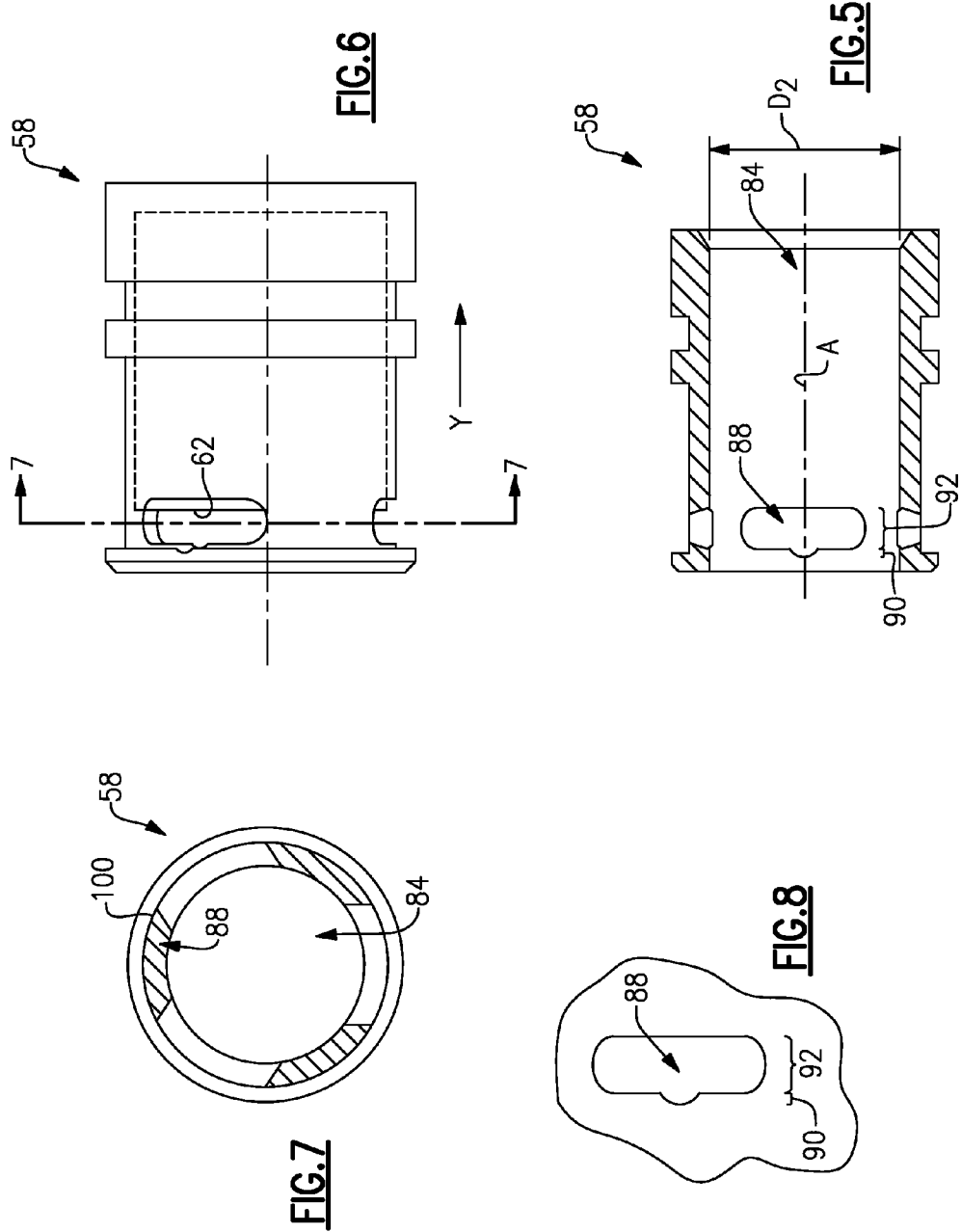

_US 9,194,291 B2_

TURBOMACHINE WINDMILL BYPASS VALVE

BACKGROUND

This disclosure relates generally to a valve and, more particularly, to a bypass valve for controlling a turbomachine fuel flow.

Turbomachines, such as gas turbine engines, typically include a fan section, a compression section, a combustion section, and a turbine section. Air flow enters the turbomachine through the fan section. The air is compressed in the compression section. The compressed flow is mixed with fuel and combusted in the combustion section. The products of combustion are expanded through the turbine section to drive rotors of the turbomachine.

Many turbomachines include a fuel control assembly. Fuel delivery valves of the fuel control assembly deliver fuel to the combustion section. Fuel windmill bypass valves of the fuel control assembly communicate flow away from the fuel delivery valves during engine shutdown. The windmill bypass valve maintains sufficient muscle pressure to position the actuators during windmilling and start. Shutdown of the engine may occur on the ground, or in flight during, for example, an over-speed condition.

SUMMARY

An example windmill bypass valve includes a sleeve providing a bore that extends along an axis. The sleeve has at least one window. The windmill bypass valve also includes a spool received within the bore. The spool is configured to move within the bore between a first position that restricts flow through at least one window and a second position that permits flow through the at least one window of the sleeve. An outer diameter of the spool is from 99.90 to 99.95 percent of a diameter of the bore.

Another example windmill bypass valve includes a sleeve providing a bore that extends along an axis. The sleeve has at least one window. The valve also includes a spool translates axially within the bore. The spool is configured to move within the bore between a first position that restricts flow through at least one window and a second position that permits flow through the at least one window of the sleeve. The Flow Gain through the windows is from 0.00 square inches/ 0.001 inches to 0.001185 square inches/0.001 inches.

DESCRIPTION OF THE FIGURES

The various features and advantages of the disclosed examples will become apparent to those skilled in the art from the detailed description. The figures that accompany the detailed description can be briefly described as follows:

FIG. 5 is a section view of a valve sleeve of the fuel windmill bypass valve of FIG. 3.

FIG. 6 is a side view of the valve sleeve of FIG. 5 with a spool.

FIG. 7 is a section view at line 7-7 in FIG. 6.

FIG. 8 shows a close-up view of a window of the fuel windmill bypass valve of FIG. 3.

DETAILED DESCRIPTION

Figure 1:
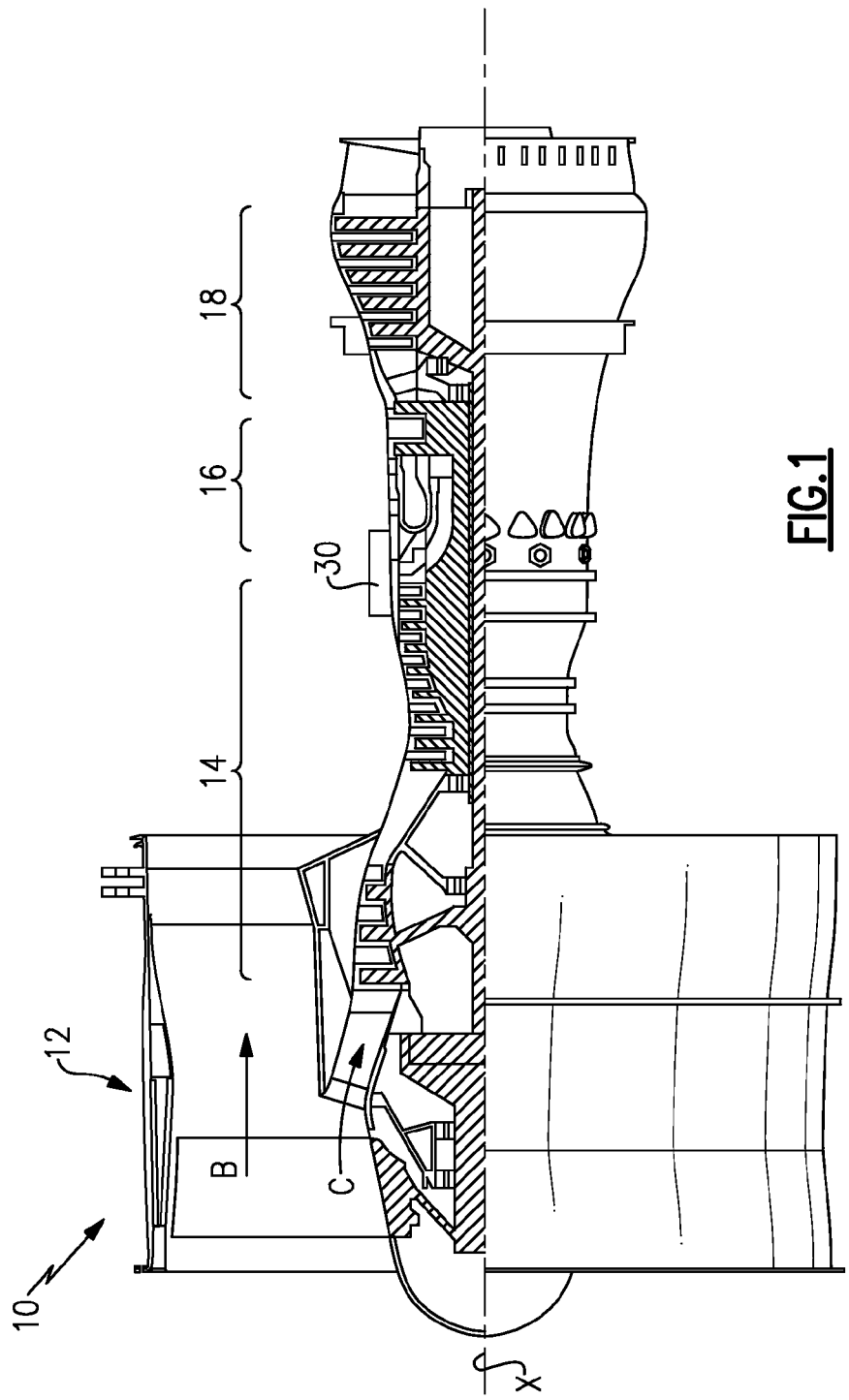
FIG. 1 is a cross-section view of an example turbomachine having a fuel delivery arrangement.

Referring to FIG. 1, a gas turbine engine 10 is used to propel an aircraft. The gas turbine engine 10 is a type of turbomachine.

The example gas turbine engine 10 includes a fan section 12, a compressor section 14, a combustion section 16 and a turbine section 18. Alternative engines might include an augmenter section (not shown) among other systems or features. The fan section 12 drives air along a bypass flow path B while the compressor section 14 draws air in along a core flow path C where air is compressed and communicated to a combustion section 16. In the combustion section 16, air is mixed with fuel and ignited to generate a high pressure exhaust gas stream that expands through the turbine section 18 where energy is extracted and utilized to drive the fan section 12 and the compressor section 14. In this example, the turbine section 18 drives the fan section 12 through a geared architecture 15 such that the fan section 12 may rotate at a speed different than the turbine section 18.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section 14.

The example gas turbine engine includes a fuel system 16 that supplies fuel from a fuel supply to the combustion section 16 and also to other devices within the gas turbine engine that may utilize fuel for heat exchanging or for powering actuators.

Figure 2A:
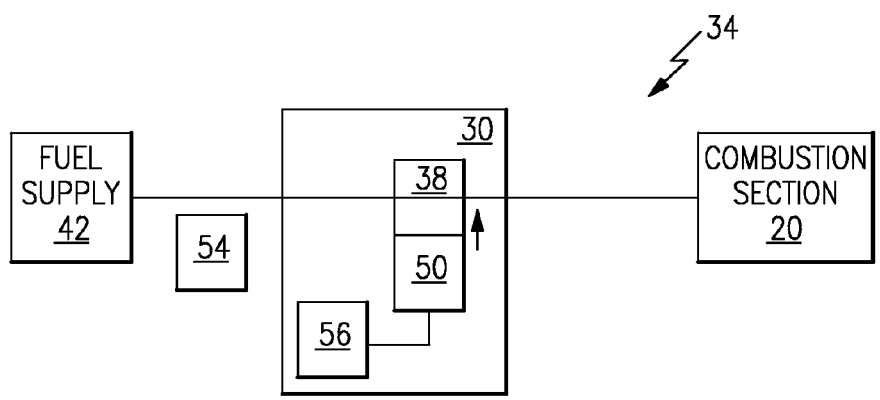
FIG. 2A is a highly schematic view of the fuel delivery arrangement in a fuel delivery position.
Figure 2B:
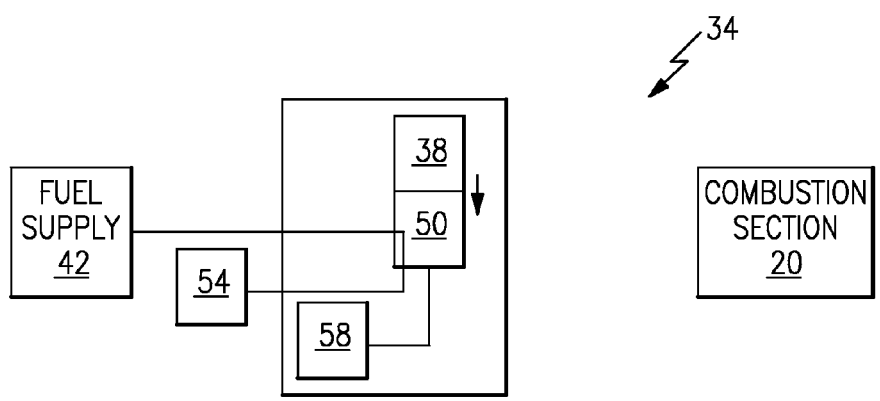
FIG. 2B is a highly schematic view of the fuel delivery arrangement in a fuel bypass position.

Referring to FIGS. 2A and 2B with continuing reference to FIG. 1, the fuel system or (fuel control assembly 30) forms a portion of a fuel delivery arrangement 34. During normal operation, components of the fuel delivery arrangement 34 are in a fuel delivery position. Under some conditions, such as a shutdown of the gas turbine engine 10, components of the fuel delivery arrangement 34 are moved to a fuel bypass position. The gas turbine engine 10 may be windmilling when the gas turbine engine 10 is shutdown.

The fuel control assembly 30 includes at least one fuel delivery valve 38. In some examples, eight fuel delivery valves are used. When the fuel delivery arrangement 34 is in the fuel delivery position, fuel from a fuel supply 42 moves through the fuel delivery valve 38 to the combustion section 16.

The fuel control assembly 30 also includes at least one fuel bypass valve 50. In some examples, two fuel bypass valves are used. When the fuel delivery arrangement 34 is in the fuel bypass position, fuel from the fuel supply 42 moves through the fuel bypass valve 50 to an overflow area 54. Depending upon the architecture of the engine 10, the bypass flow will either return to the fuel supply 42 or recirculate within fuel lines until the engine 10 spools down and there is no more demand for fuel flow thru the lines. In some examples, after shutdown, many engines drain manifold lines between the fuel control assembly 30 and the combustion section 16 by either a valve piston that, when translated, has enough volume capacity to handle the fuel lines or a separate small reservoir or bowl that will accept the manifold fuel.

When in the fuel bypass position, the fuel delivery arrangement 34 is able to receive fuel from the fuel supply 42 without delivering fuel to the combustion section 16. Delivering fuel to the combustion section 16 during an engine shutdown, for example, may be problematic as is known.

In this example, a solenoid 56 is selectively activated to move the fuel bypass valve 50. Moving the fuel delivery valve 38, the fuel bypass valve 50, or both moves the fuel delivery arrangement 34 between the fuel delivery position and the fuel bypass position.

Figure 3:
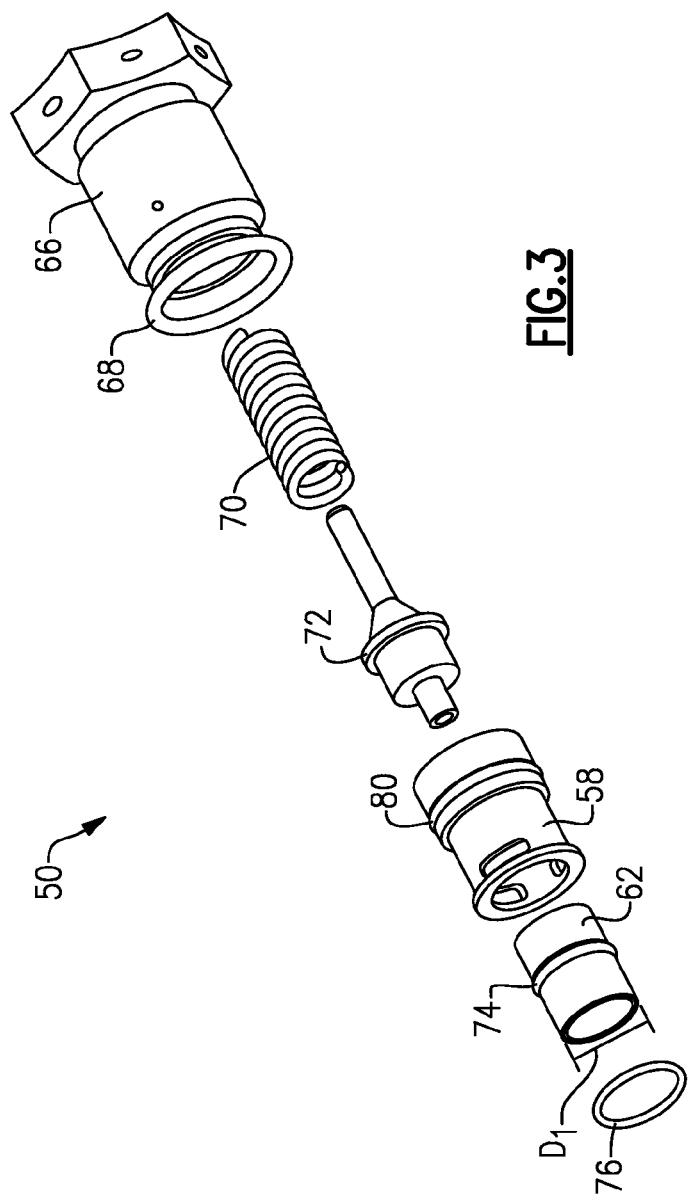
FIG. 3 is an exploded view of a fuel windmill bypass valve of the FIG. 2A arrangement.
Figure 4:
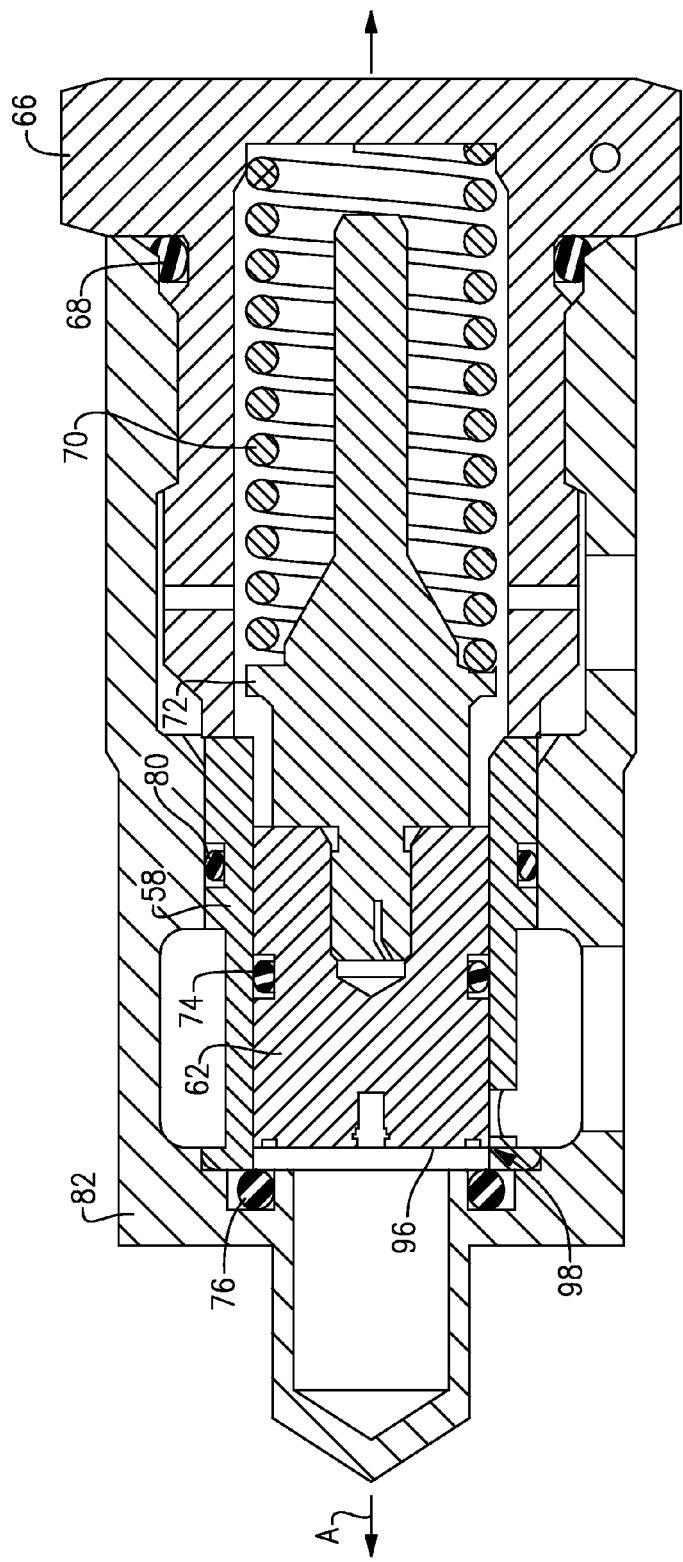
FIG. 4 is a section view of the fuel windmill bypass valve of FIG. 3.

Referring now to FIGS. 3 to 8 with continuing reference to FIGS. 1 to 3, the fuel bypass valve 50 includes a sleeve 58 that receives a spool 62. The sleeve 58 and the spool 62 make up a valve set. In this example, the fuel bypass valve 50 also includes a cap 66, a cap seal 68, a spring 70, a spool spacer 72, a spool seal 74, a face seal 76, a sleeve seal 80, and a housing 82. The components of the fuel bypass valve are arranged about an axis A.

To move the fuel delivery arrangement 34 between the fuel delivery position and the fuel bypass position, the solenoid 56 moves the spool 62 axially relative to the sleeve 58. A person having skill in this art and the benefit of this disclosure would understand how to configure the solenoid 56 to move the spool 62 relative to the sleeve 58 in this way.

The spool 62 is held within a bore 84 of the sleeve 58. An outer diameter $D_1$ of the spool 62 is smaller than a diameter $D_2$ of the bore 84. In some examples, the outer diameter $D_1$ is from 99.90 to 99.95 percent the diameter $D_2$. Making the outer diameter $D_1$ smaller than the diameter $D_2$, and within the above range, has been found to facilitate axial movement of the spool 62 within the bore 84.

The sleeve 58 includes, in this example, three windows 88 that are able to communicate fuel when not blocked by the spool 62. In the fuel delivery position, the spool 62 blocks movement of fuel through the windows 88 so that the fuel moves to the combustion section 16. Moving the spool 62 axially relative to the sleeve 58 allows fuel to communicate radially through the windows 88 to the overflow area 54.

The windows 88 include a low gain portion 90 and a high gain portion 92. As the spool 62 is moved axially within the sleeve 58 in a direction Y, the low gain portion 90 of the windows 88 are initially opened for communicating fuel F from the fuel supply 42 to the overflow area 54.

In FIG. 6, the spool 62 has been moved by the solenoid 56 in the direction Y to a position having the low gain portion 90 fully opened and the high gain portion 92 partially opened.

After more movement of the spool 62 relative to the sleeve 58 in the direction Y, the high gain portion 92 is also fully opened. When the windows 88 are fully opened, the area of the low gain portion 90 that is available for communicating fuel is lower than the area of the high gain portion 92 that is available for communicating fuel.

Making the low gain portion 90 available for communicating fuel prior to the high gain portion 92 facilitates a gradual increase of fuel moving through the windows 88. The gradual increase facilitates reducing resonance associated with fuel movement through the windows.

The axial position of the spool 62 within the sleeve 58 determines the amount of low gain portion 90 and high gain portion 92 available for communicating flow.

In this example, a ratio of the area of the windows 88 to the axial position of the spool 62 relative to the sleeve 58 is from 0.00 square inches/0.001 inches to 0.001185 square inches/ 0.001 inches. This ratio may be referred to as gain. Gain is the change in fuel flow going thru the window 88 as a function of the stroke of the fuel bypass valve 50. How much the area of the window 88 changes as a function of the fuel bypass valve 50 stroke is a relationship that is adjusted to reduce undesired flow characteristics of fuel moving through the fuel bypass valve 50, this could be stabilizing flow perturbations, etc.

In some positions, an end 96 of the spool 62 contacts the face seal 76. In this example, an outer perimeter of the end 96 has a chamfer 98 that is from 0.001 to 0.005 inches (0.0025 to 0.0127 centimeters). Maintaining the chamfer 98 within this range has been found to reduce damage to the face seal 76.

An edge 100 associated with the windows 88 has a maximum break of 0.001 inches (0.0025 cm). There is some gain with associate with the break at the edge 100. Keeping the break at the edge at or below this size has been found to desirably minimize this gain such that the areas of the low gain portion 90 and the high gain portion 92 may be primarily used to control flow.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A turbomachine comprising:
    a combustor;
    a bypass valve having a sleeve and a spool,
        the sleeve providing a bore that extends along an axis, the sleeve having at least one window, and
        the spool received within the bore, the spool configured to move back and forth within the bore between a first position that restricts flow through at least one window and a second position that permits flow through the at least one window of the sleeve, wherein an outer diameter of the spool is from 99.90 to 99.95 percent of a diameter of the bore,
    wherein the flow moves to the combustor of the turbomachine when the spool is in the first position within the bore.

2. The turbomachine of claim 1, including a solenoid configured to actuate the spool from the first position to the second position.

3. The turbomachine of claim 1, wherein a gain through the at least one window is from 0.00 square inches/0.001 inches to 0.001185 square inches/0.001 inches.

4. The turbomachine of claim 3, wherein gain is a ratio of an area of the at least one window available to communicate fuel to an axial position of the spool within the bore.

5. The turbomachine of claim 1, wherein the at least one window has a low gain portion and a high gain portion.

6. The turbomachine of claim 5, wherein the low gain portion is positioned upstream the high gain portion, such that fuel moves first through the low gain portion and then the high gain portion when the spool moves from the first position to the second position.

7. The turbomachine of claim 1, wherein the first position permits no flow.

8. The turbomachine of claim 1, including a fuel within the bore when the spool is in the second position.

9. A bypass valve comprising:
    a sleeve providing a bore that extends along an axis, the sleeve having at least one window; and
    a spool received within the bore, the spool configured to move within the bore between a first position that restricts flow through at least one window and a second position that permits flow through the at least one window of the sleeve, wherein an outer diameter of the spool is from 99.90 to 99.95 percent of a diameter of the bore, wherein the spool moves away from an end of the sleeve when moving from the first position to the second position, and the end of the sleeve is configured to contact a seal, the end of the sleeve having a chamfer that is from 0.001 to 0.005.

10. A bypass valve comprising:
a sleeve providing a bore that extends along an axis, the sleeve having at least one window; and
a spool slidably received within the bore, the spool configured to move back and forth within the bore between a first position that restricts flow through at least one window and a second position that permits flow through the at least one window of the sleeve, wherein gain through the windows is from 0.00 square inches/0.001 inches to 0.001185 square inches/0.001 inches.

11. The bypass valve of claim 10, including a solenoid configured to actuate the spool from the first position to the second position.

12. The bypass valve of claim 10, wherein a gain through the at least one window is from 0.00 square inches/0.001 inches to 0.000395 square inches/0.001 inches.

13. The bypass valve of claim 12, wherein gain is a ratio of an area of the at least one window available to communicate fuel to an axial position of the spool within the bore.

14. The bypass valve of claim 10, wherein the at least one window has a low gain portion and a high gain portion.

15. The bypass valve of claim 10, wherein the spool moves away from an end of the sleeve when moving from the first position to the second position, and the end of the sleeve is configured to contact a seal, the end of the sleeve having a chamfer that is from 0.001 to 0.005 in the inner diameter of the sleeve.

16. The bypass valve of claim 10, including a fuel within the bore when the spool is in the second position.

17. A turbomachine comprising the bypass valve of claim 10, and further including a combustor, wherein the flow moves to the combustor of the turbomachine when the spool is in the first position within the bore.

* * * * *